Feb. 15, 1955               G. E. HAYS               2,702,238
APPARATUS FOR CONTROLLING SYNTHESIS REACTIONS
Filed Nov. 20, 1950
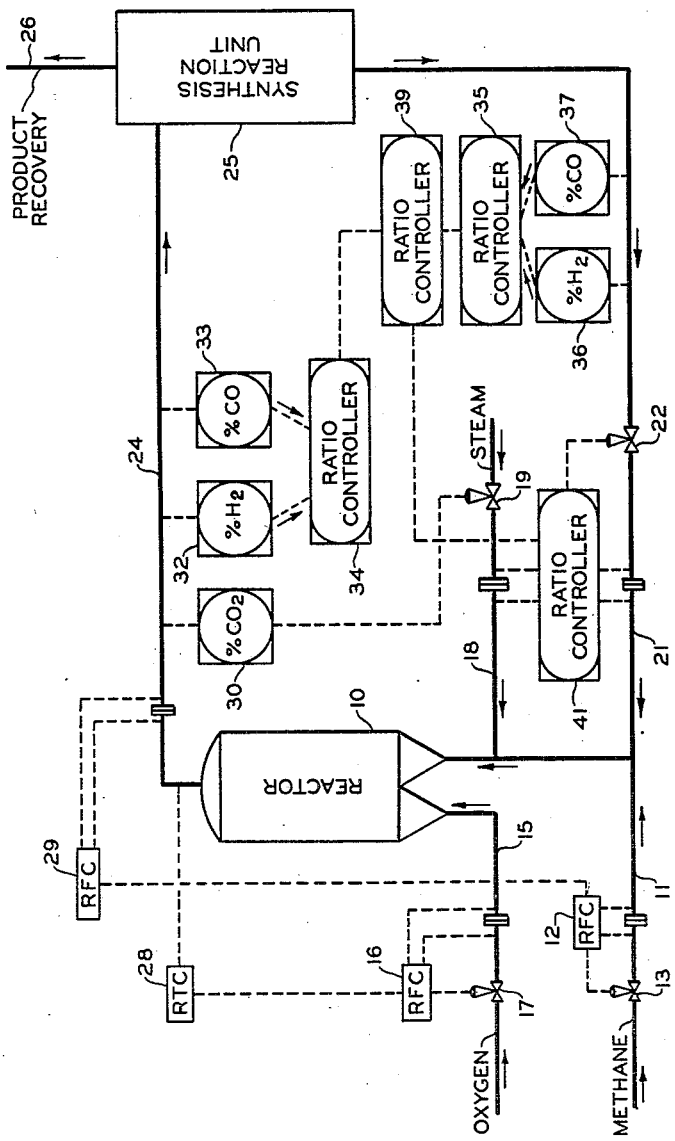
*INVENTOR.*
G. E. HAYS
BY *Hudson & Young*
*ATTORNEYS*

United States Patent Office 2,702,238
Patented Feb. 15, 1955

2,702,238

APPARATUS FOR CONTROLLING SYNTHESIS REACTIONS

George E. Hays, Bartlesville, Okla., assignor to Phillips Petroleum Company, a corporation of Delaware Application November 20, 1950, Serial No. 196,672

8 Claims. (Cl. 48—196)

This invention relates to an apparatus for controlling reactions of the synthesis type. In another aspect, it relates to a completely integrated control system whereby synthesis or make gases are automatically provided to a Fischer-Tropsch system in proper volume and proportions.

This application is a continuation-in-part of my copending application, Serial No. 67,675, filed December 28, 1948, now abandoned, entitled Apparatus for Controlling Synthesis Reactions.

In conducting the Fischer-Tropsch process, readily available hydrocarbons, such as methane or natural gas, are reacted with oxygen, steam, and recycle gas containing carbon dioxide under such conditions of temperature and pressure as to provide a make or synthesis gas consisting essentially of hydrogen and carbon monoxide with a small percentage of carbon dioxide. In the Fischer-Tropsch reaction, this make gas is converted to valuable hydrocarbon products, such as gasoline or cracking stock, together with hydrogen and a small proportion of carbon monoxide, carbon dioxide and methane. The present invention provides a method of and apparatus for controlling the manufacture of synthesis gas so that its reacting components are in the proper proportions for the Fischer-Tropsch reaction while, at the same time, oxygen and natural gas consumption is reduced to a minimum.

It is an object of the invention to provide an integrated control system for producing make gas for the Fischer-Tropsch reaction from natural gas, oxygen, and steam.

It is a further object of the invention to provide synthesis gas wherein the reacting components are in the proper proportions for the Fischer-Tropsch reaction and in which oxygen and natural gas consumption is reduced to a minimum.

Various other objects and advantages of the invention will be apparent to those skilled in the art from the following disclosure and description, taken in conjunction with the accompanying drawing, in which the figure is a flow diagram of a synthesis unit embodying the novel control system.

Referring now to the drawing in detail, I have shown a reactor 10, which may be of the pebble type, for producing a make gas or synthesis gas consisting of hydrogen and carbon monoxide with a small proportion of carbon dioxide. Methane is fed to the reactor 10 through a line 11 which is provided with a rate of flow controller 12 operating an automatic control valve 12. Oxygen is supplied to the reactor 10 through a line 15 which is provided with a rate of flow controller 16 operating an automatic control valve 17. Steam is supplied to the reactor 10 through a line 18 in which is disposed an automatic control valve 19 while recycle gas is supplied to the reactor by line 21 in which there is an automatic control valve 22.

The methane, oxygen, steam, and recycle gas are subjected to the proper conditions of temperature and pressure within the reactor 10 as to produce make gas or synthesis gas which passes overhead through a line 24 to a synthesis reaction unit 25 of the Fischer-Tropsch type. Preferably and advantageously, the Fischer-Tropsch reaction is carried out with the use of a fluid catalyst, such as powdered iron oxide, at a pressure of 400 pounds per square inch gage and a temperature within the range of 575 to 625° F. The unit 25 is intended to represent the entire Fischer-Tropsch reaction system from which products, such as hydrocarbons having boiling points within the gasoline range, are recovered from a line 26 and from which a portion of the tail gas or recycle gas is removed through the line 21.

In accordance with the invention, the control system of the present invention provides make gas in which the carbon monoxide and hydrogen are in the proper ratio for consumption by the synthesis unit 25 with the use of a minimum of methane and oxygen in the reactor 10. To this end, a control unit 28 is provided which is responsive to the temperature of the overhead gases from reactor 10 and this controller actuates rate of flow controller 16 to vary the flow of oxygen to the reactor in accordance with the temperature therein. Thus, if the reactor temperature becomes too high, controllers 16, 28 are actuated to reduce the flow of oxygen to the reactor whereas, if the reactor temperature falls below a predetermined value, the controllers 16, 28 are actuated to increase the rate of flow of oxygen to the reactor 10.

A rate of flow controller 29 is responsive to the flow rate of synthesis gas in line 24 and this unit controls rate of flow controller 12 to vary the methane feed rate in accordance with the rate of flow of synthesis gas passing through the line 24. Thus, if the flow rate in line 24 falls below a predetermined value, the controllers 12, 29 are actuated to increase the rate of feed through line 11 to the reactor whereas, if the flow rate rises above such predetermined value, the controllers 12, 29 are actuated to reduce the methane feed to the reactor. Those skilled in the art will understand that the controllers 12, 16 may be omitted in some cases, in which case the flow rate of oxygen is directly controlled by the unit 28 while the flow of methane is directly controlled by unit 29, although some sacrifice in precision of control results from omission of the auxiliary controllers 12 and 16.

The automatic control valve 19 in steam line 18 is controlled by an analyzer 30 which is responsive to the concentration of carbon dioxide in the synthesis gas passing through line 24. The rate of flow of steam is increased if the carbon dioxide concentration in the synthesis gas falls below a predetermined value and, conversely, the rate of flow of steam is decreased if the carbon dioxide concentration in the synthesis gas becomes too high.

In accordance with the invention, additional analyzer units 32 and 33 are provided which are responsive, respectively, to the hydrogen and carbon monoxide concentration of the gas passing through line 24. The analyzers 32 and 33, in turn, actuate a ratio controller 34 which produces a variable quantity, such as air pressure, proportional to the hydrogen-carbon monoxide ratio of the synthesis gas passing through line 24. In similar fashion, a ratio controller 35 is actuated by analyzers 36 and 37 which are responsive, respectively, to the hydrogen and carbon monoxide concentration in the recycle gas passing through line 21. Accordingly, controller 35 produces a variable quantity, such as air pressure, which is proportional to the hydrogen-carbon monoxide ratio in the recycle gas. The variable quantities produced by the controllers 34, 35 are compared in a ratio controller 39 which produces a variable quantity, such as air pressure, proportional to the ratio between the synthesis gas hydrogen-carbon monoxide ratio and the recycle gas hydrogen-carbon monoxide ratio. This last variable quantity is transmitted to a ratio controller 41 which determines the volume ratio between the steam passing through line 18 and the recycle gas passing through line 21. The controller 41 is so adjusted as to maintain proportionality between the steam-recycle gas ratio and the variable quantity produced by controller 39 through operation of automatic control valve 22. Accordingly, the control unit increases the recycle gas to steam ratio if the hydrogen-carbon monoxide ratio is higher in the recycle gas than in the synthesis gas and decreases the recycle gas-steam ratio if the hydrogen-carbon monoxide ratio is lower in the recycle gas than in the synthesis gas. In this manner, I integrate the control of the make gas reaction and the Fischer-Tropsch reaction.

The main purpose of the control system consisting of units 32 to 39, inclusive, is to so control the composition of the make gas fed to the synthesis reaction unit 25 that the proportion of hydrogen to carbon monoxide therein is the same as the proportion of hydrogen to carbon monoxide consumed in the reaction unit 25. When this desirable condition prevails, it necessarily follows that the hydrogen-carbon monoxide ratio in the tail gas is the same as that in the make gas, since all free hydrogen and carbon monoxide leave the unit 25 as tail gas. Furthermore, a small difference betwen the ratio of consumption of hydrogen and carbon monoxide in unit 25, as compared to the hydrogen and carbon monoxide fed to the unit through line 24, produces a relatively large change in the hydrogen-carbon monoxide ratio of the tail gas passing through line 21. This will become apparent upon consideration of the following explanation. Assuming that the process is operating in the desired manner so that hydrogen and carbon monoxide are consumed in the reaction unit 25 at the same rate as they are being introduced in the make gas, conditions are as follows:

| Component | Mols in Make Gas | Mols Consumed in Reaction Unit 25 | Mols in Tail Gas |
|---|---|---|---|
| $H_2$ | 64 | 54 | 10 |
| $CO$ | 32 | 27 | 5 |
|  | 96 | 81 | 15 |
| $H_2$-$CO$ | 2:1 | 2:1 | 2:1 |

It will be noted that the hydrogen-carbon monoxide ratio is 2:1 in the make gas and the tail gas.

If a change occurs in the synthesis reaction unit so that the hydrogen-carbon monoxide ratio changes, say to 2.3:1, the following conditions prevail:

| Component | Mols in Make Gas | Mols Consumed in Reaction Unit 25 | Mols in Tail Gas |
|---|---|---|---|
| $H_2$ | 64 | 56.5 | 7.5 |
| $CO$ | 32 | 24.5 | 7.5 |
|  | 96 | 81 | 15 |
| $H_2$-$CO$ ratio | 2:1 | 2.3:1 | 1:1 |

It will be apparent that a slight increase in the hydrogen-carbon monoxide ratio of the material consumed in the reaction produces a large decrease in the hydrogen-carbon monoxide ratio of the tail gas. More specifically, in the example given, an increase in ratio from 2:1 to 2.3:1 in material consumed produces a decrease in ratio from 2:1 to 1:1 in the tail gas. Responsive to this action, controller 39 actuates controller 41 so as to increase the ratio of steam to recycle tail gas fed to the reactor 10 with the result that the hydrogen-carbon monoxide ratio in the make gas is increased. This increase in ratio continues until the ratio in the make gas becomes 2.3:1 and the hydrogen and carbon-monoxide are again fed to the reaction unit at the same rate at which they are being consumed therein. As this condition is approached, the controller 41 operates more slowly since the difference between the ratio in the make gas and tail gas becomes progressively smaller. As a result, the hydrogen-carbon monoxide ratio in the make gas increases more slowly, the closer it approaches the desired value of 2.3:1 so that hunting difficulties are eliminated or substantially minimized.

This will become evident upon consideration of conditions after the correction process has started but before it has reached completion.

| Component | Mols in Make Gas | Mols Consumed in Reaction Unit 25 | Mols in Tail Gas |
|---|---|---|---|
| $H_2$ | 66 | 56.5 | 9.5 |
| $CO$ | 30 | 24.5 | 5.5 |
|  | 96 | 81 | 15 |
| $H_2$-$CO$ ratio | 2.2:1 | 2.3:1 | 1.7:1 |

From the latter table, which indicates conditions existing when the ratio in the make gas has increased to 2.2:1, it will be noted that the difference between the ratios in the make gas to the tail gas is substantially less (0.5) than was the case when the correction started (at which time the difference was 1.0). Accordingly, the speed of correction progressively becomes smaller as the desired condition is approached where the hydrogen-carbon monoxide content of the make gas is such as to furnish the desired products. However, the difference between the ratios always remains in the same sense until the desired condition prevails.

To simplify the aforenoted relations, it was assumed that the amount of carbon monoxide and hydrogen consumed in the reaction and included in the make gas remained constant. However, it will be evident that the results follow with equal validity notwithstanding minor variations in flow caused by the action of flow controllers 12 and 29. It will be evident from the above calculations that, should the ratio of hydrogen to carbon monoxide consumed decrease, a relatively large increase will be produced in this ratio in the tail gas. As a result, controller 41 will be operated in an opposite manner to decrease the ratio of steam to recycle tail gas fed to the reactor 10, thereby decreasing the hydrogen-carbon monoxide ratio in the make gas until it is equal to that consumed in the reaction.

The same result follows if, for some reason, the hydrogen-carbon monoxide ratio in the make gas should change without a change in the manner of consumption of these materials in the synthesis reaction unit 25. Assuming that the ratio in the make gas increases from 2:1 to 2.2:1, then the conditions will be as indicated in the following table:

| Component | Mols in Make Gas | Mols Consumed in Reaction Unit 25 | Mols in Tail Gas |
|---|---|---|---|
| $H_2$ | 66 | 54 | 12 |
| $CO$ | 30 | 27 | 3 |
|  | 96 | 81 | 15 |
| $H_2$-$CO$ ratio | 2.2:1 | 2:1 | 4:1 |

From this table, it will be noted that an increase in hydrogen-carbon monoxide ratio from 2.0 to 2.2:1 produces an increase in the ratio of the tail gas of from 2:1 to 4:1. As previously explained, this causes a decrease in the ratio of steam to recycle tail gas fed to the reactor 10 with the result that the ratio in the make gas is decreased until it again becomes 2:1 and the materials are consumed by the synthesis reaction unit at the same rate at which they are fed thereto.

The important fact will be noted that a small change in the ratio at which hydrogen and carbon monoxide are consumed in the reaction or a small change in the hydrogen-carbon monoxide ratio of the make gas produces a large change in the hydrogen-carbon monoxide ratio in the tail gas, thereby causing operation of the controllers 39 and 40 to so adjust the conditions in reactor 10 as to make the hydrogen-carbon monoxide ratio in the make gas and the tail gas the same, at which time the hydrogen and carbon monoxide fed to the synthesis reaction unit are consumed in stoichiometric proportions.

In some cases, analyzer 37 may be omitted and ratio controller 39 then compares the hydrogen concentration in the recycle gas with the hydrogen-carbon monoxide ratio in the synthesis gas to provide the signal fed to controller 41. In still another modification, the controllers 35, 36, 37, and 39 may all be omitted and the output of controller 34 may be fed directly to controller 41. In this case controller 41 maintains proportionality between the hydrogen-carbon monoxide ratio in the synthesis gas and the steam-recycle gas ratio of the feed passing to reactor 10 through lines 18 and 21.

In general, the tail gas passing through line 21 contains substantially more carbon dioxide than does the make gas produced by the reactor 10. Accordingly, it will be apparent that regulation of the flow rate of recycle gas effectively varies the rate of carbon dioxide feed to the reactor since the recycle gas may contain 19.0 per cent carbon dioxide as compared to 0.4 per cent in the synthesis gas.

It will be apparent that I have provided a control system whereby the methane feed to the synthesis reactor is regulated to use the minimum amount of methane consistent with the required rate of flow of synthesis gas to the reactor unit 25 and that the oxygen fed to the reactor 10 is regulated so as to utilize a minimum amount thereof consistent with proper temperature within the synthesis reactor. Finally, the steam and recycle gas flow rates are so controlled as to maintain the proper relation, in general, equality between the hydrogen-carbon monoxide ratio in the feed and the hydrogen-carbon monoxide ratio in the recycle gas with the result that hydrogen and carbon monoxide are fed to the reaction unit 25 in the same proportion as they are consumed therein in making products.

While the invention has been described in connection with present, preferred embodiments thereof, it will be understood that this description is illustrative only and is not intended to limit the invention, the scope of which is defined by the appended claims.

I claim:

1. Control apparatus comprising, in combination, a reactor for converting methane, steam and oxygen to a make gas consisting essentially of hydrogen and carbon monoxide, three lines communicating with said reactor for supplying methane, steam and oxygen, respectively, thereto, a synthesis unit for converting said make gas to a product containing hydrocarbons and a tail gas containing carbon monoxide and hydrogen, an effluent conduit leading from said reactor to said synthesis unit, a tail gas conduit communicating with said synthesis unit and said reactor, a valve in said last-mentioned conduit for controlling the flow of tail gas therethrough, a ratio controller having a sensing device connected to said steam line and a sensing device in said tail gas conduit, said ratio controller being operatively connected to said valve so as to maintain a preset ratio between the steam and tail gas fed to said reactor, and a second ratio controller operably connected with first said ratio controller for varying the setting of said first ratio controller, said second ratio controller having a first and second sensing device communicating with said effluent conduit and responsive, respectively, to the hydrogen and carbon monoxide concentration in said make gas, said second controller being adjusted to produce an output representative of the ratio of hydrogen to carbon monoxide in the make gas.

2. Control apparatus comprising, in combination, a reactor for converting methane, steam and oxygen to a make gas consisting essentially of hydrogen and carbon monoxide, three lines communicating with said reactor for supplying methane, steam and oxygen, respectively, thereto, a synthesis unit for converting said make gas to a product containing hydrocarbons and a tail gas containing carbon monoxide and hydrogen, an effluent conduit leading from said reactor to said synthesis unit, a tail gas conduit communicating with said synthesis unit and said reactor, a valve in said last-mentioned conduit for controlling the flow of tail gas therethrough, a first ratio controller having a sensing device connected to said steam line and a sensing device in said tail gas conduit, said ratio controller being operatively connected to said valve so as to maintain a preset ratio between the steam and tail gas fed to said reactor, a second ratio controller operatively connected to said first ratio controller so as to vary the setting thereof, a third ratio controller operably connected to said second ratio controller to vary the setting thereof, said third ratio controller having a pair of sensing devices communicating with said effluent conduit and responsive, respectively, to the hydrogen concentration and carbon monoxide concentration in said effluent conduit, and a fourth ratio controller operatively connected to said second ratio controller so as to vary the setting thereof, said fourth ratio controller including a sensing device communicating with said tail gas conduit and responsive to the hydrogen concentration therein.

3. Control apparatus comprising, in combination, a reactor for converting methane, steam and oxygen to a make gas consisting essentially of hydrogen and carbon monoxide, three lines communicating with said reactor for supplying methane, steam and oxygen, respectively, thereto, a synthesis unit for converting said make gas to a product containing hydrocarbons and a tail gas containing carbon monoxide and hydrogen, an effluent conduit leading from said reactor to said synthesis unit, a tail gas conduit communicating with said synthesis unit and said reactor, a valve in said last-mentioned conduit for controlling the flow of tail gas therethrough, a first ratio controller having a sensing device in said tail gas conduit and a sensing device in said steam line, said ratio controller being operatively connected to said valve so as to maintain a preset ratio between the steam and tail gas fed to said reactor, a second ratio controller operatively connected to said first ratio controller so as to vary the setting thereof, a third ratio controller operably connected to said second ratio controller to vary the setting thereof, said third ratio controller having a pair of sensing devices communicating with said effluent conduit and responsive, respectively, to the hydrogen concentration and carbon monoxide concentration therein, and a fourth ratio controller operatively connected to said second ratio controller so as to vary the setting thereof, said fourth ratio controller having a pair of sensing devices communicating with said tail gas conduit and responsive, respectively, to the hydrogen and carbon monoxide concentrations therein.

4. Control apparatus constructed in accordance with claim 3 in which said ratio controllers are adjusted so as to maintain the equality between the hydrogen-carbon monoxide ratio in the make gas and the hydrogen-carbon monoxide ratio in the tail gas, whereby hydrogen and carbon monoxide are fed to the synthesis unit at the same rate as that at which they are consumed therein.

5. Control apparatus comprising, in combination, a reactor for converting methane, steam and oxygen to make gas consisting essentially of hydrogen and carbon monoxide, three lines communicating with said reactor for supplying methane, steam and oxygen, respectively, thereto, a synthesis unit for converting said make gas to a product containing hydrocarbons and a tail gas containing carbon dioxide, carbon monoxide and hydrogen, an effluent conduit leading from said reactor to said synthesis unit, a tail gas conduit communicating with said synthesis unit and said reactor, a valve in said last-mentioned conduit for controlling the flow of tail gas therethrough, a first ratio controller having a sensing device in said tail gas conduit and a sensing device in said steam line, said ratio controller being operatively connected to said valve so as to maintain a preset ratio between the steam and tail gas fed to said reactor, a second ratio controller operatively connected to said first ratio controller so as to vary the setting thereof, a third ratio controller operably connected to said second ratio controller to vary the setting thereof, said third ratio controller having a pair of sensing devices communicating with said effluent conduit and responsive, respectively, to the hydrogen concentration and carbon monoxide concentration in said effluent conduit, a fourth ratio controller operatively connected to said second ratio controller so as to vary the setting thereof, said fourth ratio controller having a pair of sensing devices communicating with said tail gas conduit and responsive, respectively, to the hydrogen and carbon monoxide concentrations therein, an automatic control valve in said methane line, a rate of flow controller operatively connected to said valve and having a sensing device communicating with said make gas conduit, said rate of flow controller being set so as to open and close said valve in response to the rate of flow of make gas from the reactor to maintain said flow rate at a predetermined value.

6. Control apparatus comprising, in combination, a reactor for converting methane, steam and oxygen to make gas consisting essentially of hydrogen and carbon monoxide, three lines communicating with said reactor for supplying methane, steam and oxygen, respectively, thereto, a synthesis unit for converting said make gas to a product containing hydrocarbons and a tail gas containing carbon dioxide, carbon monoxide and hydrogen, an effluent conduit leading from said reactor to said synthesis unit, a tail gas conduit communicating with said synthesis unit and said reactor, a valve in said last-mentioned conduit for controlling the flow of tail gas therethrough, a first ratio controller having a sensing device in said tail gas conduit and a sensing device in said steam line, said ratio controller being operatively connected to said valve so as to maintain a preset ratio between the steam and tail gas fed to said reactor, a second ratio controller operatively connected to said first ratio controller so as to vary the setting thereof, a third ratio controller operably connected to said second ratio controller to vary the setting thereof, said third ratio controller having a pair of sensing devices communicating with said effluent conduit and responsive, respectively, to the hydrogen concentration and carbon monoxide concentration in said effluent conduit, a fourth ratio controller operatively connected to said second ratio controller so as to vary the setting thereof, said fourth ratio controller having a pair of sensing devices communicating with said tail gas conduit and responsive, respectively, to the hydrogen and carbon monoxide concentrations therein, an automatic control valve in said methane line, a rate of flow controller operatively connected to said valve and having a sensing device communicating with said make gas conduit, said rate of flow controller being set so as to open and close said methane line valve in response to the rate of flow of make gas from the reactor to maintain said flow rate at a predetermined value, an automatic control valve in said oxygen line, a temperature controller operatively connected to said oxygen line valve to vary the rate of flow of oxygen therethrough, said temperature controller having a sensing element communicating with said reactor, an automatic control valve in said steam line, a controller operatively connected to said steam line valve and having a sensing device communicating with said make gas conduit, said last-mentioned sensing device being responsive to the concentration of carbon dioxide in said make gas conduit so as to vary the rate of flow of steam in accordance with said carbon dioxide concentration.

7. Control apparatus constructed in accordance with claim 6 in which said ratio controllers are adjusted so as to maintain the equality between the hydrogen-carbon monoxide ratio in the make gas and the hydrogen-carbon monoxide ratio in the tail gas, whereby hydrogen and carbon monoxide are fed to the synthesis unit at the same rate as that at which they are consumed therein.

8. Control apparatus comprising, in combination, a reactor for converting methane, steam and oxygen to a make gas consisting essentially of hydrogen and carbon monoxide, three lines communicating with said reactor for supplying methane, steam and oxygen, respectively, thereto, a synthesis unit for converting said make gas to a product containing hydrocarbons and a tail gas containing carbon monoxide and hydrogen, an effluent conduit leading from said reactor to said synthesis unit, a tail gas conduit communicating with said synthesis unit and said reactor, a valve in said last-mentioned conduit for controlling the flow of tail gas therethrough, a ratio controller having a sensing device in said tail gas conduit and a sensing device in said steam line, said ratio controller being operatively connected to said valve so as to maintain a preset ratio between the steam and tail gas fed to said reactor, a second ratio controller operatively connected to said first ratio controller so as to vary the setting thereof, said ratio controller having a pair of sensing devices communicating with said tail gas conduit and responsive, respectively, to the hydrogen and carbon monoxide concentration in said tail gas conduit whereby the rate of flow of steam and product gas to the make gas reaction is controlled so as to maintain a desired hydrogen-carbon monoxide ratio in said tail gas.

References Cited in the file of this patent

UNITED STATES PATENTS

| | | |
|---|---|---|
| 1,576,001 | Olden | Mar. 9, 1926 |
| 1,777,894 | Porter | Oct. 7, 1930 |
| 1,923,865 | Handforth | Aug. 22, 1933 |
| 1,933,641 | Schmidt | Nov. 7, 1933 |
| 1,999,740 | Schmidt | Apr. 30, 1935 |
| 2,013,727 | Douglass et al. | Sept. 10, 1935 |
| 2,243,869 | Keith et al. | June 3, 1941 |
| 2,274,064 | Howard et al. | Feb. 24, 1942 |
| 2,533,666 | Gunness | Dec. 12, 1950 |

FOREIGN PATENTS

| | | |
|---|---|---|
| 631,319 | Great Britain | Nov. 1, 1949 |

OTHER REFERENCES

Storch et al., "The Fischer-Tropsch and Related Syntheses," pages 500 and 536, (1951). John Wiley and Sons, Inc., N. Y.